US007004397B2

(12) United States Patent
Fujita et al.

(10) Patent No.: US 7,004,397 B2
(45) Date of Patent: Feb. 28, 2006

(54) ELECTRONIC APPARATUS, POWER CONTROL OF ELECTRONIC APPARATUS AND MOVING METHOD OF FRONT PANEL OF ELECTRONIC APPARATUS

(75) Inventors: Hiroaki Fujita, Saitama (JP); Jun Shinkawa, Saitama (JP)

(73) Assignee: Pioneer Corporation, Tokyo (JP)

(*) Notice: Subject to any disclaimer, the term of this patent is extended or adjusted under 35 U.S.C. 154(b) by 205 days.

(21) Appl. No.: 10/420,875

(22) Filed: Apr. 23, 2003

(65) Prior Publication Data

US 2003/0201323 A1 Oct. 30, 2003

(30) Foreign Application Priority Data

Apr. 26, 2002 (JP) ........................... P2002-125140

(51) Int. Cl.
*G06K 13/00* (2006.01)

(52) U.S. Cl. ..................................................... 235/476

(58) Field of Classification Search ................ 235/476, 235/474, 475, 477, 483, 485–486; 312/270.1, 312/270.2, 270.3, 271–276; 710/301
See application file for complete search history.

(56) References Cited

U.S. PATENT DOCUMENTS 4,986,618 A * 1/1991 Wakatsuki .................. 312/276
5,177,730 A * 1/1993 Utsugi ........................ 720/646
5,815,468 A * 9/1998 Muramatsu et al. ........... 369/2
6,147,596 A * 11/2000 Tsuchiya et al. ......... 340/425.5
6,182,173 B1 * 1/2001 Grosser et al. ............. 710/302
6,629,643 B1 * 10/2003 Nagata et al. .............. 235/475
6,690,574 B1 * 2/2004 Kasahara et al. ........... 361/683
6,757,504 B1 * 6/2004 Amano ........................ 399/88

FOREIGN PATENT DOCUMENTS

WO 200034079 A1 * 6/2000

* cited by examiner

*Primary Examiner*—Diane I. Lee
(74) *Attorney, Agent, or Firm*—Sughrue Mion, PLLC

(57) ABSTRACT

When a front panel is opened, a microcomputer decides that it reached a predetermined angle by counting the number of pulses generated by a pulse generator, and a CPU controls a power switch and turns off a power supplied to a card type record medium. Also, when the microcomputer detects an input of a front panel operation button in a state in which the front panel has opened and when a switch is ON, the CPU recognizes that the card type record medium is present and detects whether or not a terminal for connection detection of the card type record medium has been electrically connected and when it has not been connected, it is recognized that the card type record medium is in a half insertion state and a closing operation is not performed.

8 Claims, 9 Drawing Sheets

ELECTRONIC APPARATUS, POWER CONTROL OF ELECTRONIC APPARATUS AND MOVING METHOD OF FRONT PANEL OF ELECTRONIC APPARATUS

The present disclosure relates to the subject matter contained in Japanese Patent Application No. 2002-125140 filed on Apr. 26, 2002, which is incorporated herein by reference in its entirety.

BACKGROUND OF THE INVENTION

1. Field of the Invention

The present invention relates to an electronic apparatus, a power control method of an electronic apparatus and a moving method of a front panel of an electronic apparatus, and particularly to an electronic apparatus, a power control method of an electronic apparatus and a moving method of a front panel of an electronic apparatus capable of opening and closing an openable and closable front panel provided in the front of a record medium storage portion.

2. Description of the Related Art

In an electronic apparatus such as a vehicle-mounted AV (audio-video) apparatus, there is an apparatus having a moving device of a record medium such as a CD, a DVD, a card type record medium. Further, there is an apparatus having an openable and closable front panel in the front of such a vehicle-mounted AV apparatus.

In the vehicle-mounted AV apparatus providing such a front panel, there was conventionally no apparatus providing a card slot for inserting a card type record medium based on TYPE I or TYPE II in conformity with PCMCIA standards.

On the other hand, there is an apparatus providing such card slot in a notebook-sized personal computer or in its peripheral device. The card slot provided in such an apparatus is constructed so that an eject button is placed at the side of an insertion hole for a card type record medium and by pushing the eject button, insertion and ejection of the card type record medium are enabled.

However, in case that the eject button is pushed by mistake when in a state of supplying a power to the card type record medium, the state so-called energization, a data stored in the card type record medium may fails electrically. Therefore, various ideas are provided so that insertion and ejection of the card cannot be performed during energization.

Conventionally, in order to prevent the electrical failure, a lamp is provided to indicate that the card type record medium is in the energization, or a warning message is provided by a sound or a video indication on a display. However, those ideas are not perfect for protecting the card from the electrical failure.

It is considered effective by providing a manually controllable power switch at the side of an insertion hole for the card and mechanically interlocked with an eject button, so that unless the power switch is turned off, the eject button is locked and cannot be pushed.

However, even in this case, one needs to operate the power switch manually and operationality becomes bad. Also, in such a manual power switch, its structure becomes large, and there occurs a problem that it is unsuitable for an apparatus requiring savings in space, particularly for a vehicle-mounted apparatus.

Also, in a case that the front panel is closed when the card is imperfectly inserted into a slot, so-called half inserted state, the front panel makes contact with the card and affects a smooth opening and closing operations of the front panel.

SUMMARY OF THE INVENTION

The invention is implemented in view of the circumstances described above, and an object of the invention is to provide an electronic apparatus, a power control method of an electronic apparatus and a moving method of a front panel of an electronic apparatus capable of protecting an apparatus body and a card type record medium in the case of inserting or ejecting the card type record medium to or from a record medium storage portion of an apparatus providing a front panel.

In order to achieve the object, according to a first aspect of the invention, there is provided an electronic apparatus including a body part having a record medium storage portion for storing at least a card type record medium insertable and ejectable from an insertion hole provided at a front surface thereof; a front panel provided at the front surface of the body part; a support member attached to a lower end of the front panel and supports the front panel rotatably by using the lower end of the front panel as the center of rotation; a panel moving mechanism for moving the support member in forward and backward directions, thereby moving the front panel to an opened state in which the front panel is tilted so that a front surface of the front panel turns upward and the front surface of the body part to be exposed, and to an closed state in which the front panel is raised upright and covers the front surface of the body part; and a power control section for controlling a power supplied to the card type record medium in conjunction with movement of the front panel.

According to the first aspect of the invention, in the case that the panel moving mechanism moves the support member forward and it is shifted to the opened state by tilting the front panel so that the front surface of the front panel turns upward and insertion of the card type record medium to the record medium storage portion is enabled, power control section controls a power supplied to the card type record medium in conjunction with movement of the front panel. As a result of this, in the case of inserting and ejecting the card type record medium to and from the record medium storage portion, power supply is stopped and the card type record medium can be inserted and ejected safely.

According to a second aspect of the invention, there is provided a electronic apparatus including: a body part having a record medium storage portion for storing at least a card type record medium insertable and ejectable from an insertion hole provided at a front surface thereof; a front panel provided at the front surface of the body part; a support member attached to a lower end of the front panel and supports the front panel rotatably by using the lower end of the front panel as the center of rotation; a panel moving mechanism for moving the support member in forward and backward directions, thereby moving the front panel to an opened state in which the front panel is tilted so that a front surface of the front panel turns upward and the front surface of the body part to be exposed, and to an closed state in which the front panel is raised upright and covers the front surface of the body part; a first detection section for detecting whether or not the card type record medium is inserted into the record medium storage portion; a second detection section for detecting whether or not the card type record medium is electrically connected to the electric apparatus; a determination section for determining an insertion state of the card type record medium based on a state detected by the first detection section and a connection state detected by the second detection section; and a movement control section for controlling the panel moving mechanism based on the insertion state determined by the determination section.

According to the second aspect of the invention, the determination section determines an insertion state of the card type record medium based on a detected result as to whether or not the card type record medium has been inserted into the record medium storage portion by the first detection section and a detected result as to whether or not the card type record medium has been electrically connected to the electronic apparatus by the second detection section and movement control section controls the panel moving mechanism based on this determination result, so that opening and closing operations of the front panel can be performed in response to the insertion state of the card type record medium. As a result of this, the card type record medium can be inserted and ejected safely.

According to a third aspect of the invention, there is provided a power control method for an electronic apparatus having a body part having a record medium storage portion for storing at least a card type record medium insertable and ejectable from an insertion hole provided at a front surface thereof, a front panel provided at the front surface of the body part, a support member attached to a lower end of the front panel and supports the front panel rotatably by using the lower end of the front panel as the center of rotation, and a panel moving mechanism for moving the support member in forward and backward directions, thereby moving the front panel to an opened state in which the front panel is tilted so that a front surface of the front panel turns upward and the front surface of the body part to be exposed, and to an closed state in which the front panel is raised upright and covers the front surface of the body part, a method including: detecting a tilt state of the front panel based on a signal issued in conjunction with opening and closing operations of the front panel; stopping a power supplied to the card type record medium when determined that either the insertion hole or an operation part for ejecting the card type record medium from the record medium storage portion provided at the front surface of the body part is exposed based on the detecting of the tilt state of the front panel.

According to the third aspect of the invention, in the case that the panel moving mechanism moves the support member forward and it is shifted to the opened state in which insertion of the card type record medium to the record medium storage portion is enabled by tilting the front panel so that the front of the front panel turns upward, supply of a power is stopped and controlled when it is decided that a tilt state of the front panel detected based on a signal issued in conjunction with opening and closing operations of the front panel is tilted to a state in which either an insertion hole of a record medium storage portion for ejectably storing at least a card type record medium or an operation part for ejecting the card type record medium from the record medium storage portion is exposed, so that power supply is always stopped in the case of inserting and ejecting the card type record medium. As a result of this, the card type record medium can be inserted and ejected safely.

According to a fourth aspect of the invention, there is provided a method for moving a front panel of an electronic apparatus having a record medium storage portion for storing at least a card type record medium insertable and ejectable from an insertion hole provided at a front surface thereof, a front panel provided at the front surface of the body part, a support member attached to a lower end of the front panel and supports the front panel rotatably by using the lower end of the front panel as the center of rotation, and a panel moving mechanism for moving the support member in forward and backward directions, thereby moving the front panel to an opened state in which the front panel is tilted so that a front surface of the front panel turns upward and the front surface of the body part to be exposed, and to an closed state in which the front panel is raised upright and covers the front surface of the body part, a method including: detecting whether or not the card type record medium is inserted into the record medium storage portion and whether or not the card type record medium is electrically connected to the electric apparatus, when moving the front panel to the closed state; determining that the card type record medium is not inserted properly when it is detected that the card type record medium is inserted into the record medium storage portion and that the card record medium is not electrically connected to the electronic apparatus; controlling the panel moving mechanism to stop when the card type record medium is not inserted properly.

According to the fourth aspect of the invention, the panel moving mechanism moves the support member backward and at the time of a closing operation of raising up the front of the front panel, it is detected whether or not the card type record medium has been inserted into the record medium storage portion and also it is detected whether or not the card type record medium has been electrically connected to the body part, and it is determined that the card type record medium has not been inserted properly when it is determined that the card type record medium has been inserted and has not been electrically connected, and the panel moving mechanism is to be stopped and the closing operation of the front panel is stopped. As a result of this, the card type record medium which has not been inserted properly can be prevented from interfering with the front panel.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Referring now to the accompanying drawings, An embodiment according to the invention will be described below.

Figure 1:
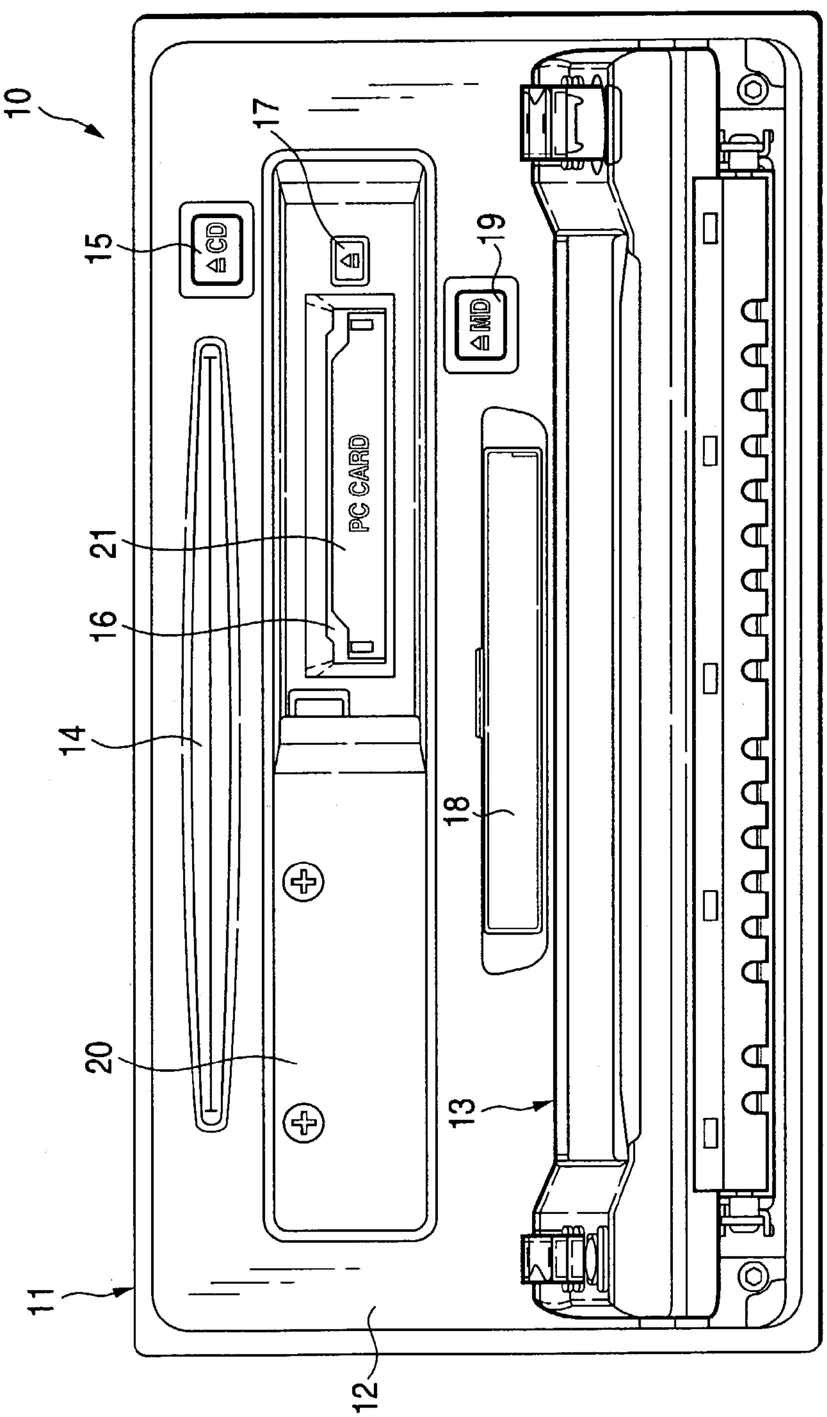
FIG. 1 is a view describing a vehicle-mounted AV apparatus according to an embodiment of the invention and is a front view showing a state in which a front panel is opened.
Figure 2:
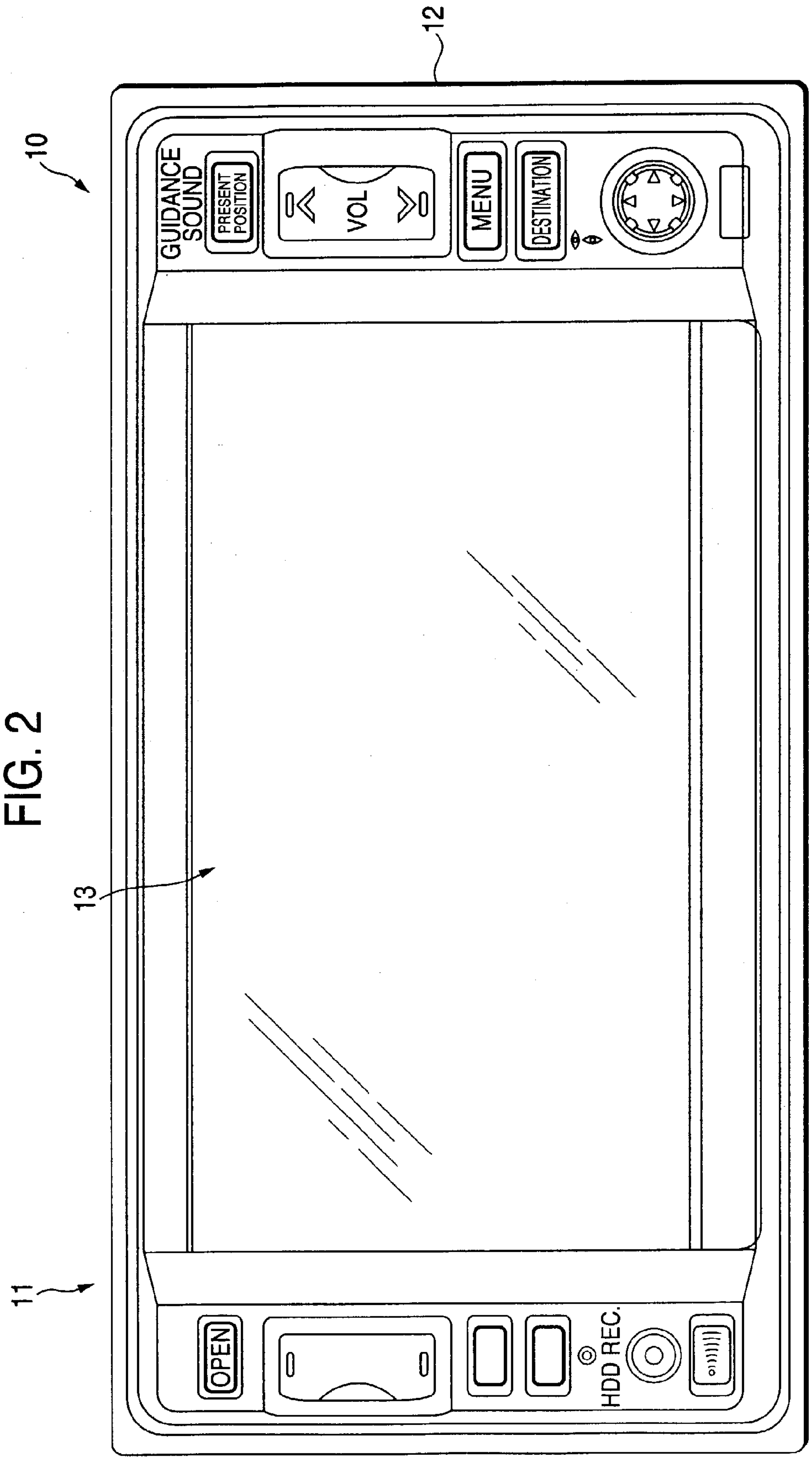
FIG. 2 is a view describing the vehicle-mounted AV apparatus and is a front view showing a state in which the front panel is closed.

FIGS. 1 and 2 are views describing a vehicle-mounted AV apparatus according to an embodiment of the invention.

As shown in FIGS. 1 and 2, the AV apparatus 11 has a moving device of a CD (or may be a DVD), an MD and a card slot, and provides an openable and closable front panel 13 provided in the front of an AV apparatus body 12 which is a body part, and FIG. 1 shows a state in which the front panel 13 is opened, and FIG. 2 shows a state in which the front panel 13 is closed. This front panel 13 is opened and closed using a panel moving mechanism described later.

In a state in which the front panel 13 is opened, as shown in FIG. 1, a CD insertion hole 14 and a CD eject button 15 are exposed to the upper part of the front and a card type record medium insertion hole 16 acting as an insertion hole and a card type record medium eject button 17 which is an operation part for ejectment are exposed thereunder and an MD insertion hole 18 and MD eject button 19 are exposed thereunder.

Incidentally, a storage device (such as a hard disk which is not shown) for storing information about other media or storing information about map data necessary in the case of further combining a car navigation function with the AV apparatus 11 can be built into the inside of a lid 20 of the left side of the card type record medium insertion hole 16.

In a card slot 21 which is a record medium storage section, a card type record medium based on TYPE I or TYPE II in conformity with PCMCIA standards can be inserted from the insertion hole 16. Further, various record media of other standards can be inserted through a conversion adapter.

When inserting media such as the CD, the card type record medium, the MD into the AV apparatus body 12, the media are inserted by opening the front panel 13. Also, in the case of ejecting each of the media, the media can be ejected from the AV apparatus body 12 by pushing each of the eject buttons 15, 17, 19.

Each of the insertion holes 14, 16, 18 of the CD, the card type record medium, the MD is provided sequentially from the upper part of the AV apparatus body 12. As a result of this, in the case of inserting each of the media, it is unnecessary to open the front panel 13 to a state in which all the insertion holes are visible (a fully opened state). That is, it may be constructed so that the front panel 13 is opened to an angle of a state in which the insertion hole 14 of the CD is visible in the case of inserting or ejecting the CD and it is opened to an angle of a state in which the insertion hole 16 of the card type record medium is visible in the case of inserting or ejecting the card type record medium and it is opened to an angle of a state in which the insertion hole 18 of the MD is visible in the case of inserting or ejecting the MD.

Further, it may be provided so that a display, which functions as a display section and a notification section, is provided on a surface of the front panel 13 and displays a warning of insertion or ejection of the CD, the card type record medium, the MD. Also, such display may be used for displaying an image of a car navigation, a DVD video, or a TV.

Figure 3:
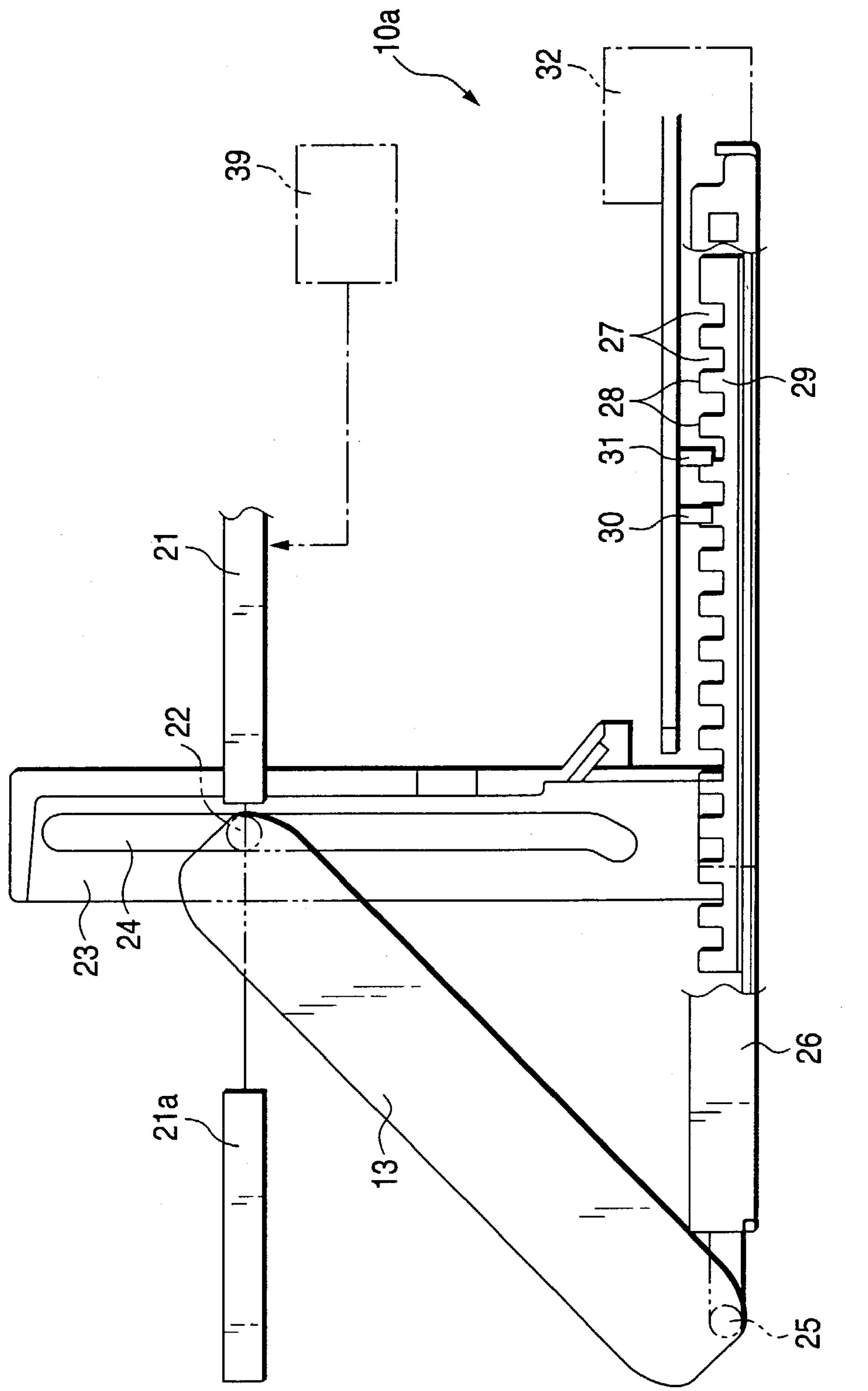
FIG. 3 is a side view describing a front panel moving mechanism of the vehicle-mounted AV apparatus.

Next, a panel moving mechanism 10*a* for opening and closing the front panel 13 will be described by referring to FIG. 3. FIG. 3 is a side view describing the panel moving mechanism 10*a* of the front panel 13 of the vehicle-mounted AV apparatus 11. Incidentally, in FIG. 3, illustration of moving devices of the CD and the MD is omitted.

As shown in FIG. 3, a sliding pin 22 is mounted in the upper end of the front panel 13 and this sliding pin 22 is constructed so as to vertically move along a vertical guide groove 24 provided in a frame 23 of the AV apparatus body 12.

On the other hand, a rotating pin 25 is provided in the lower end of the front panel 13 and is rotatably mounted in the front end of a support member 26 provided movably in backward and forward directions (right and left directions in FIG. 3) in the lower end of the AV apparatus body 12.

Incidentally, in the inside of the support member 26, a scale member 29 in which many recess parts 27 and protrusion parts 28 are provided alternately at regular pitches is provided so as to move integrally. Photo sensors 30, 31 for detecting the recess parts 27 and the protrusion parts 28 which are signal generation section are provided over the scale member 29 at predetermined intervals.

Also, a moving motor 32 for opening and closing the front panel 13 by moving the support member 26 backward and forward is provided in the back (right in FIG. 3) of the support member 26.

Therefore, the moving motor 32 moves the support member 26 backward and forward through a movement mechanism (not shown) and thereby the front panel 13 is opened and closed. At this time, it is constructed so that the photo sensors 30, 31 detect the recess parts 27 and the protrusion parts 28 of the scale member 29 to issue a pulse signal and an angle of opening and closing of the front panel 13 can be detected from this pulse signal.

Figure 4:
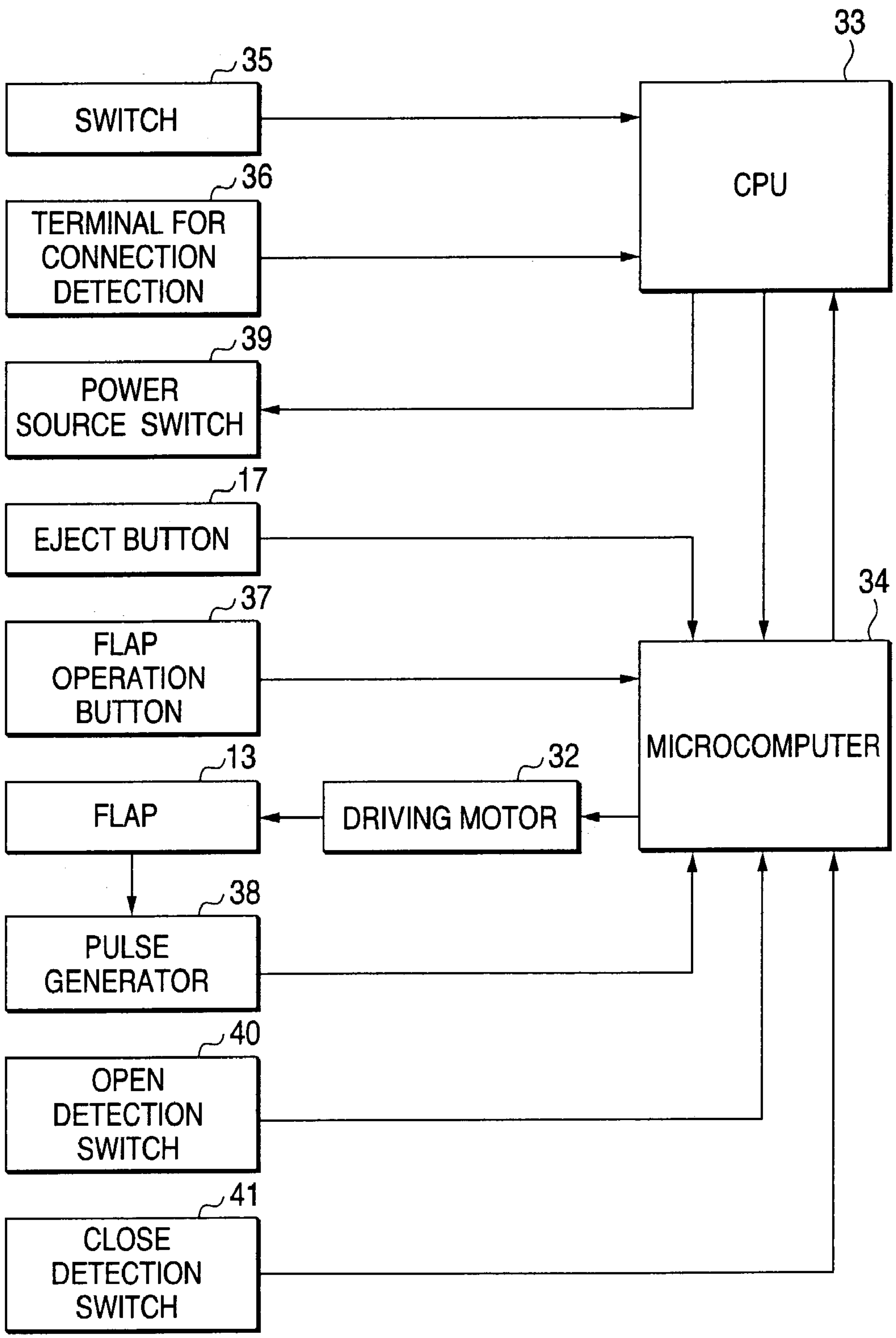
FIG. 4 is a block diagram of a control part of the vehicle-mounted AV apparatus.

Next, a control part for controlling a power supplied to a card type record medium of a vehicle-mounted AV apparatus according to the embodiment and a panel moving mechanism will be described. FIG. 4 is a block diagram showing a configuration of a control part 10.

As shown in FIG. 4, the control part 10 comprises a CPU 33 which is determination section, a microcomputer 34 which is moving control section, a switch 35, which is first detection section, of the card type record medium insertion hole 16, a terminal 36 for connection detection, which is second detection section, of the card type record medium, a power switch 39, the eject button 17, a front panel operation button 37, the front panel 13, the front panel moving motor 32, a pulse generator 38 which is signal generation section, an opened state (OPEN) detection switch 40, and a closed state (CLOSE) detection switch.

The CPU 33 controls the power switch 39 of the card type record medium. Also, by detecting states of the switch 35 of the card type record medium insertion hole and the terminal 36 (for example, one pin of a connector in conformity with PCMCIA standards) for connection detection of the card type record medium, the presence or absence of a card type record medium 21*a* or a state in which the card type record medium 21*a* has been imperfectly inserted and has not been connected electrically, that is, a state in which the card type record medium has not been inserted properly (hereinafter also called half insertion) is detected.

The microcomputer 34 detects the front panel operation button 37, and controls the front panel moving motor 32, and recognizes and controls an angle of the front panel 13 obtained by counting the number of pulses generated by the pulse generator 38.

The switch 35 is provided in the card type record medium insertion hole 16, and detects whether or not the card type record medium 21*a* has been inserted into the cards lot 21. That is, the switch 35 is provided in a position capable of detecting the presence of the card type record medium 21*a* even in a state in which the card type record medium 21*a* has not been connected to a connector of the card slot 21.

The front panel operation button 37 is placed on the front panel 13, and a user directly operates opening and closing operations the front panel. When closed, the front panel 13 covers the insertion hole 16 of the card slot 21 or the eject button 17 of the card slot 21, and when opened, the insertion hole 16 of the card type record medium becomes insertable state and the eject button 17 becomes an operable state.

The pulse generator 38 generates a pulse signal by detecting the recess parts 27 and the protrusion parts 28 of the scale member 29 connected to the front panel 13 by the photo sensor 30, and sends the pulse signal to the microcomputer 34.

The power switch 39 is a switch of a power supplied to the card type record medium 21*a*. The opened state (OPEN) detection switch 40 detects that the front panel 13 has fully opened. Also, the closed state (CLOSE) detection switch 41 detects that the front panel 13 has closed.

At the time of an opening operation to an opened state of the front panel 13, the control part 10 constructed thus controls a power supplied to the card type record medium 21*a* in conjunction with movement of the front panel 13 and detects a tilt state of the front panel 13 based on a signal of the pulse generator 38 (signal generation section) for generating a signal in conjunction with opening and closing operations of the front panel 13 and controls the power supplied to the card type record medium 21*a*.

Also, the control part 10 controls the switch 35 (first detection section) for detecting whether or not the card type record medium 21*a* has been inserted into the card slot 21, the terminal 36 for connection detection (second detection section) for detecting whether or not the card type record medium 21*a* has been electrically connected to the AV apparatus 11, the CPU 33 (determination section) for determining an insertion state of the card type record medium 21*a* based on a state detected by the switch 35 and a state detected by the terminal 36 for connection detection, and the panel moving mechanism 10*a* based on a result of the determination.

Next, a power control method and a front panel moving method of an electronic apparatus according to the embodiment will be described below with reference to FIGS. 5 to 7.

Figure 5:
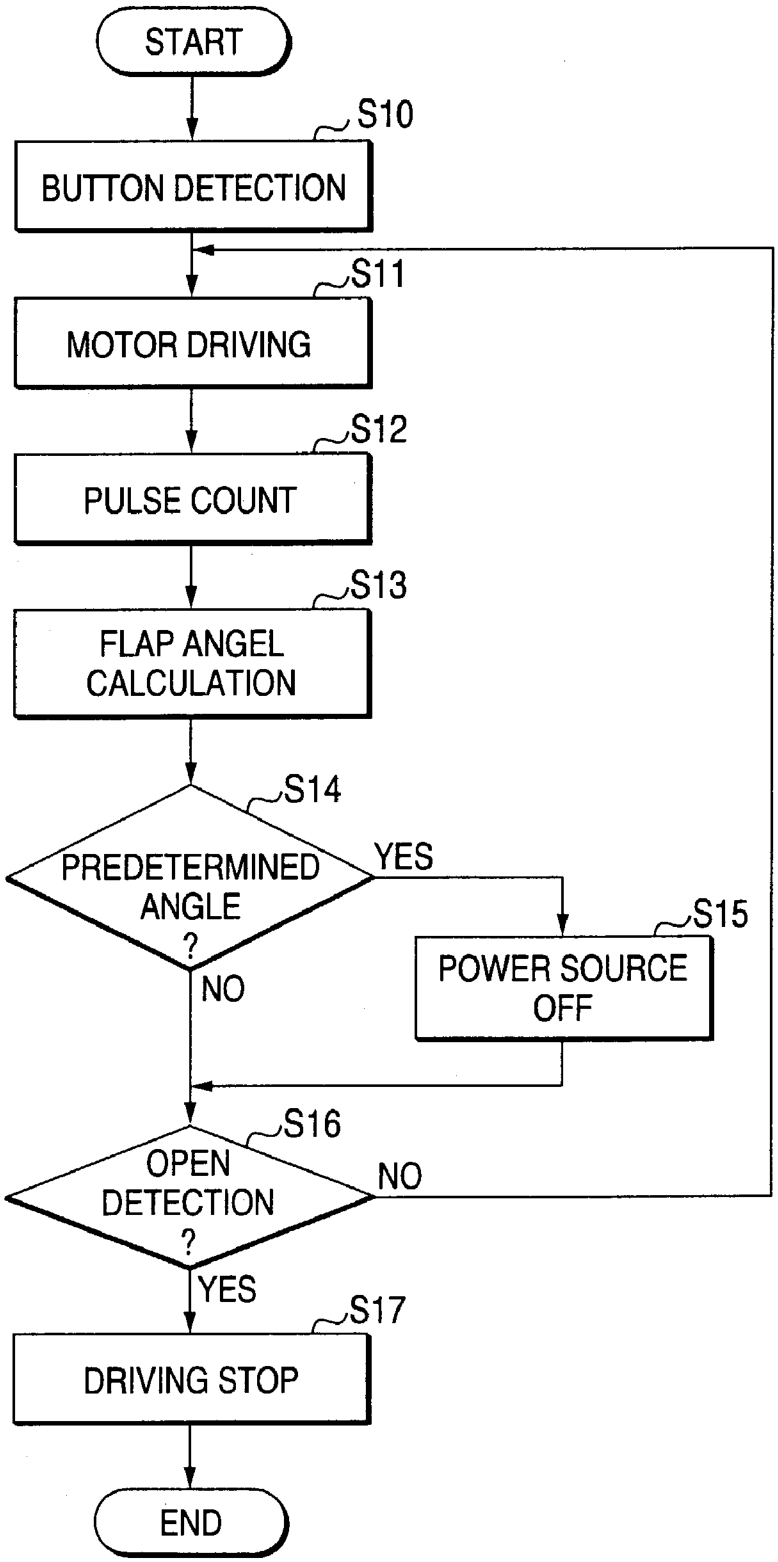
FIG. 5 is a flowchart showing a power control method for controlling a power supplied to a card type record medium at the time of shifting the front panel of the vehicle-mounted AV apparatus to an opened state.
Figure 6:
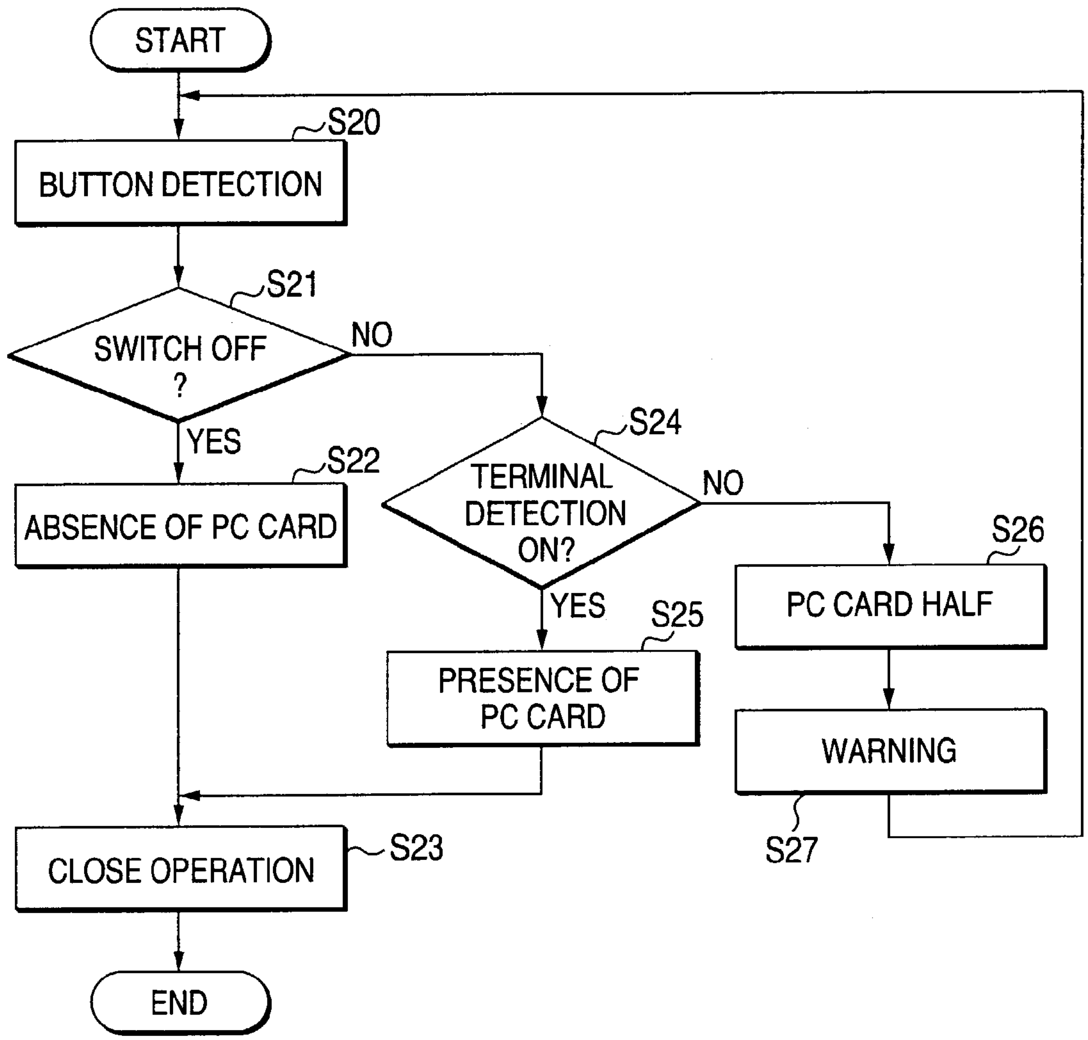
FIG. 6 is a flowchart showing a moving method for detecting half insertion of the card type record medium at the time of shifting the front panel of the vehicle-mounted AV apparatus to a closed state and moving the front panel.
Figure 7:
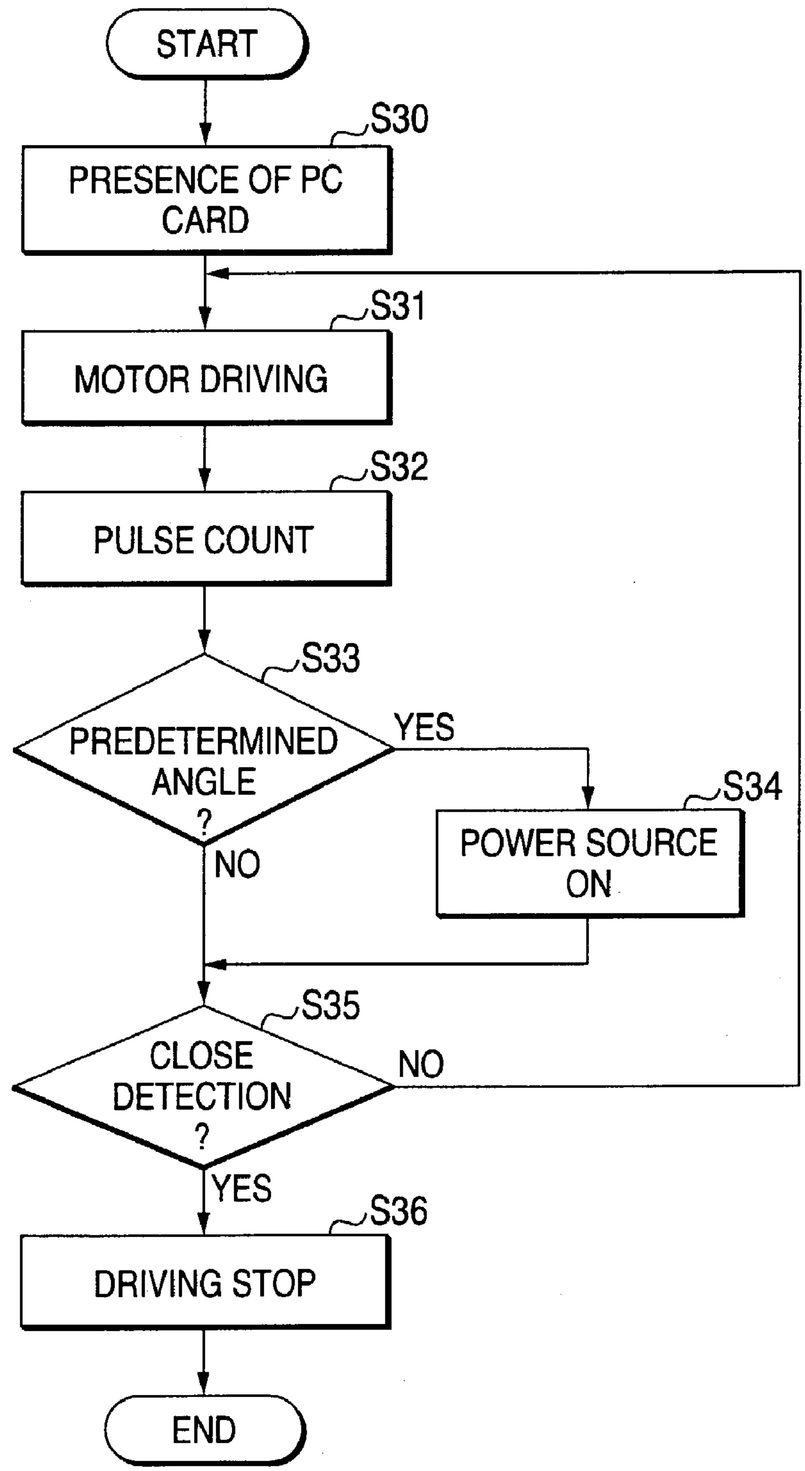
FIG. 7 is a flowchart showing a power control method for controlling the power supplied to the card type record medium at the time of shifting the front panel of the vehicle-mounted AV apparatus to the closed state.

FIG. 5 is a flowchart showing a power control method for controlling a power supplied to a card type record medium at the time of shifting the front panel 13 to an opened state, and FIG. 6 is a flowchart showing a moving method for detecting half insertion of the card type record medium at the time of shifting the front panel 13 to a closed state and moving the front panel, and FIG. 7 is a flowchart showing a power control method for controlling the power supplied to the card type record medium at the time of shifting the front panel 13 to the closed state.

First, a power control method for controlling a power supplied to a card type record medium at the time of shifting the front panel 13 to an opened state will be described with reference to the flowchart shown in FIG. 5.

A user first pushes the front panel operation button 37 in a state in which the front panel 13 is fully closed. As shown in FIG. 5, when the microcomputer 34 detects an input of the front panel operation button 37 (step S10), the moving motor 32 is actuated by control of the microcomputer 34 (step S11) and the support member 26 and the scale member 29 are advanced and an opening operation of the front panel 13 is started.

Figure 8A:
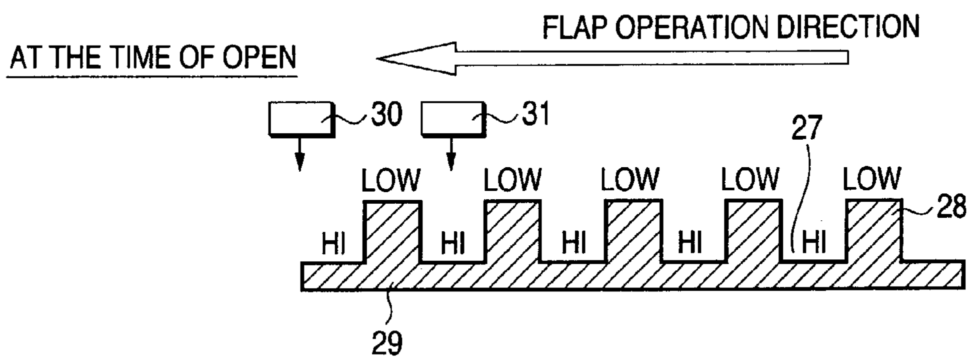
FIG. 8A is an explanatory diagram showing a relation between a scale member and photo sensors at a time of an opening operation of the front panel in the embodiment.
Figure 8B:
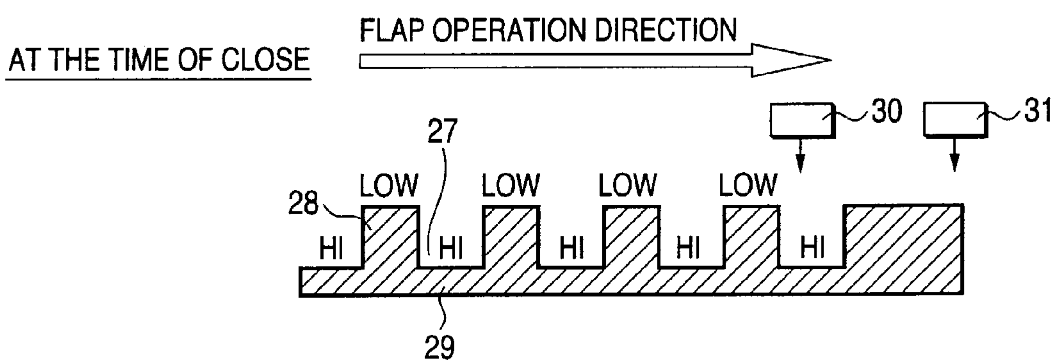
FIG. 8B is an explanatory diagram at the time of a closing operation of the front panel.

At the time of the opening operation, the photo sensors 30, 31 detect the recess parts 27 or the protrusion parts 28 of the scale member 29 as shown in FIG. 8A and send a pulse signal as shown in FIG. 8B to the microcomputer 34 and count pulses (step S12).

The microcomputer 34 calculates an angle of the front panel 13 in operation by multiplying a front panel operating angle per one pulse stored previously by the number of pulses received (step S13) and recognizes the angle constantly.

Then, the angle of the front panel 13 is compared with a predetermined angle preset (step S14) and when it is decided that the front panel 13 reaches the predetermined angle, that fact is transferred to the CPU 33 by a signal from the microcomputer 34.

Here, the predetermined angle means an angle at which first of either the insertion hole 16 of the card type record medium 21*a* or the eject button 17 (operation part) of the card type record medium is exposed.

When it is decided that the front panel 13 reaches the predetermined angle in step S14, the CPU 33 controls the power switch 39 and turns off a power supplied to the card type record medium 21*a* (step S15).

Next, the microcomputer 34 decides whether or not it is detected that the front panel 13 has become in a fully opened state (step S16) and when it is detected that it has not become in the fully opened state yet, the flowchart returns to step S11 and the moving motor 32 is actuated to continue the opening operation.

When it is detected that the front panel 13 has become in the fully opened state, the moving motor 32 is stopped (step S17).

In this manner, when the front panel 13 reaches the predetermined angle, a power of the card type record medium 21*a* is turned off before it becomes in a state in which inserting and ejecting operations of the card type record medium 21*a* can be performed, so that the card type record medium 21*a* can be protected electrically in the case of ejecting the card type record medium 21*a* from the AV apparatus body 12.

Next, detection of a state in which a card type record medium has not been inserted properly (half insertion) and moving control of a front panel will be described with reference to the flowchart shown in FIG. 6.

When the front panel operation button 37 is pushed in a fully opened state of the front panel 13, the front panel 13 attempts to perform a closing operation, but in case that the card type record medium 21*a* is in a half insertion state, there may cause a situation in which the front panel 13 makes contact with the card type record medium 21*a*. Because of this, it is necessary to detect an insertion state of the card type record medium 21*a* and detect the half insertion.

First, a user pushes the front panel operation button 37 in an opened state in which the front panel 13 has fully opened. As shown in FIG. 6, when the microcomputer 34 detects an input of the front panel operation button 37 (step S20), the microcomputer 34 transfers its input to the CPU 33.

The CPU 33 decides the presence or absence of the card type record medium 21a by the switch 35 of the card type record medium insertion hole 16 (step S21). The switch 35 is physically pushed by the card type record medium 21a to become ON in the case of inserting the card type record medium 21a into the insertion hole 16, so that it is detected that the card type record medium 21a is present.

When the switch 35 is OFF, it is recognized that the card type record medium 21a is absent (step S22) and a closing operation of the front panel 13 is started (step S23).

On the other hand, when the switch 35 is ON, it is recognized that the card type record medium 21a is present. At this time, it is decided whether or not the card type record medium 21a has been inserted normally by detecting whether or not a terminal of the card type record medium 21a has been electrically connected to a terminal of a connector of the card slot 21 (step S24).

When the terminal of the card type record medium 21a has been electrically connected to the terminal of the connector of the card slot 21, it is recognized that the card type record medium 21a has been inserted normally (step S25) and a closing operation of the front panel 13 is started (step S23).

On the other hand, when the terminal of the card type record medium 21a has not been electrically connected to the terminal of the connector of the card slot 21 in step S24, it is recognized that the card type record medium 21a is in a half insertion state (step S26) and a closing operation is not performed and a warning, for example, "insert the card type record medium normally" is given by sound and/or video (step S27). Incidentally, this warning may be visually displayed on a display provided in a surface of the front panel 13.

Thus, when the card type record medium 21a is in the half insertion state, the closing operation is not started, so that a situation in which the front panel 13 makes contact with the card type record medium 21a can be prevented.

Next, a power control method for controlling a power supplied to a card type record medium at the time of shifting the front panel 13 to a closed state will be described with reference to the flowchart shown in FIG. 7.

A user first pushes the front panel operation button 37 in an opened state in which the front panel 13 has fully opened. When it is detected that the card type record medium 21a has been inserted normally (step S30), it is evident that the front panel 13 does not interfere with the card type record medium 21a even in the case of closing the front panel 13, so that the microcomputer 34 controls the moving motor 32 (step S31) and closes the front panel 13.

Figure 9A:
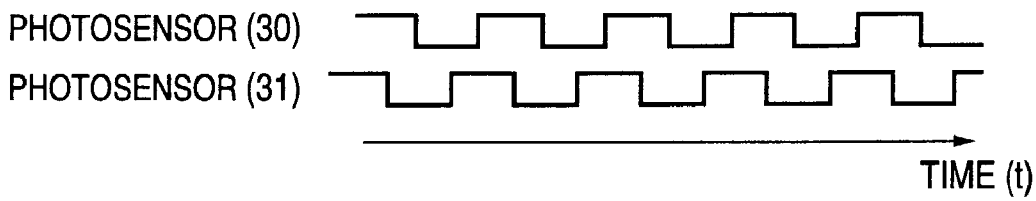
FIG. 9A is a drawing showing a sample of a pulse signal generated at the time of the opening operation of the front panel in the embodiment.
Figure 9B:
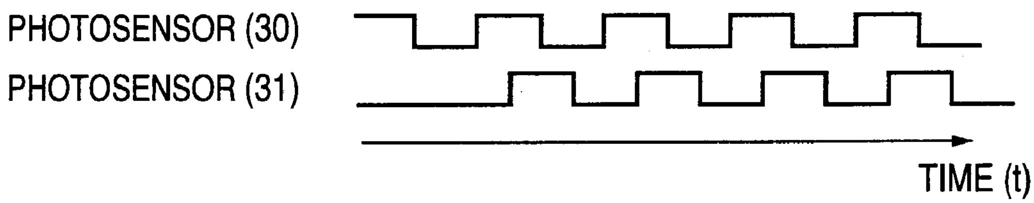
FIG. 9B is a drawing showing a sample of a pulse signal generated at the time of the closing operation of the front panel.
Figure 10:
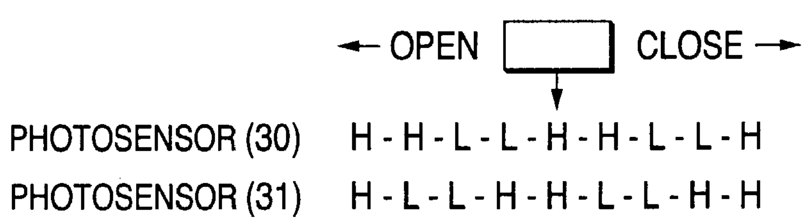
FIG. 10 is a two-bit signal based on the pulse signal shown in FIGS. 9A and 9B.

At this time, the photo sensors 30, 31 detect the recess parts 27 or the protrusion parts 28 of the scale member 29 as shown in FIG. 8B and send a pulse signal as shown in FIG. 9B to the microcomputer 34 and count pulses (step S32).

The microcomputer 34 calculates an angle of the front panel 13 in operation by multiplying a front panel operating angle per one pulse stored previously by the number of pulses received and recognizes the angle constantly.

Then, the angle of the front panel 13 is compared with a predetermined angle preset (step S33) and when it is decided that the front panel 13 is closed to the predetermined angle, that fact is transferred from the microcomputer 34 to the CPU 33 and the CPU 33 controls the power switch 39 and turns on a power supplied to the card type record medium 21a (step S34).

Here, the predetermined angle means an angle at which both the insertion hole 16 of the card type record medium 21a and the eject button 17 (operation part) of the card type record medium fully hide.

Until the microcomputer 34 detects a fully closed state by the closed state detection switch 41 (step S35), the moving motor 32 is actuated to continue a closing operation and when the fully closed state is detected, the moving motor 32 is stopped (step S36).

As described above, in the embodiment, the switch for controlling a power of the card slot 21 does not require a physical structure, so that savings in space can be achieved.

Also, since moving power control of the card type record medium 21a is automatically performed at an angle of the front panel 13 incapable of operating the insertion hole 16 of the card slot 21 or the eject button 17, a user can be prevented from inserting or ejecting the card type record medium 21a by mistake even though a power of the card slot 21 has been turned on.

Also, in the electronic apparatus, the power control method of the electronic apparatus and the moving method of the front panel of the electronic apparatus according to the embodiment, an insertion state of the card type record medium 21a is detected using the switch 35 of the insertion hole 16 of the card slot 21 and the terminal 36 for connection detection prepared for the card slot 21 and when a state in which it has not been inserted properly (half insertion) is detected, a closing operation of the front panel 13 is not performed, so that with respect to not only the card type record medium 21a in conformity with PCMCIA standards but also all the record media capable of using a conversion adapter corresponding to a card type record medium TYPE I or TYPE II, a physical failure of the front panel 13 or the record medium due to contact at the time of moving the front panel or a electrical failure of the record medium can be prevented.

Incidentally, the electronic apparatus, the power control method of the electronic apparatus and the moving method of the front panel of the electronic apparatus according to the invention are not limited to the embodiment described above, and proper changes and improvements can be made. For example, in the embodiment described above, the CPU 33 and the microcomputer 34 are provided separately, but they can be replaced with one CPU or microcomputer having both functions.

Also, in the embodiment described above, the description is made as the power control method in the vehicle-mounted AV apparatus and the moving method of the front panel of the electronic apparatus, but as long as there is an apparatus having a card slot and an openable and closable front panel in the front, it is not limited to the vehicle-mounted AV apparatus and can also be applied to other electronic apparatus.

As described above, in accordance with an electronic apparatus according to the first aspect of the invention, in the case that a panel moving mechanism moves a support member forward and it is shifted to an opened state by tilting a front panel so that the front of the front panel turns upward and insertion of a card type record medium to a record medium storage portion is enabled, power control section controls a power supplied to the card type record medium in conjunction with the movement of the front panel. As a result of this, in the case of inserting and ejecting the card type record medium to and from the record medium storage portion, power supply is stopped and the card type record medium can be inserted and ejected safely.

Also, the signal is issued from signal generation section in conjunction with opening and closing operations of the front panel, so that a tilt state of the front panel can be detected based on the signal sent. The power control section controls a power to a card type record medium based on the detected tilt state of the front panel, so that the card type record medium can be inserted and ejected safely.

Also, the power supplied to the card type record medium is stopped by the time when either an insertion hole of the record medium storage portion or an operation part for ejecting the card type record medium inserted is exposed at the time of an opening operation of the front panel, so that it can surely be prevented from ejecting the card type record medium by mistake even though a power has not stopped, and the card type record medium can be inserted and ejected safely.

Also, the determination section determines an insertion state of the card type record medium based on a detected result as to whether or not the card type record medium has been inserted into the record medium storage portion by first detection section and a detected result as to whether or not the card type record medium has been electrically connected to the electronic apparatus by second detection section and moving control section controls a panel moving mechanism based on this determination result, so that opening and closing operations of the front panel can be performed in response to the insertion state of the card type record medium. As a result of this, the card type record medium can be inserted and ejected safely.

Also, in accordance with an electronic apparatus according to the second aspect of the invention, the determination section decides that the card type record medium has not been inserted normally when the first detection section detects that the card type record medium has been inserted into the record medium storage portion and the second detection section detects that the card type record medium has not been electrically connected, and opening and closing operations of the front panel by the panel moving mechanism are stopped, so that a situation in which the front panel makes contact with the card type record medium can be avoided.

Also, the information about an insertion state of the card type record medium is displayed by display section on the basis of a determination result of the determination section based on the detected results by the first detection section and the second detection section, so that it can properly cope with the case of stopping the panel moving mechanism.

Also, when the determination section determines that the card type record medium has not been inserted properly, a warning is issued by notification section, so that a user can reinsert the card type record medium.

Also, in accordance with a power control method of an electronic apparatus according to the third aspect of the invention, in the case that the panel moving mechanism moves the support member forward and it is shifted to the opened state in which insertion of the card type record medium to the record medium storage portion is enabled by tilting the front panel so that the front of the front panel turns upward, supply of a power is stopped and controlled when it is decided that a tilt state of the front panel detected based on a signal issued in conjunction with opening and closing operations of the front panel is tilted to a state in which either an insertion hole of a record medium storage portion for ejectably storing at least a card type record medium or an operation part for ejecting the card type record medium from the record medium storage portion is exposed, so that power supply is always stopped in the case of inserting and ejecting the card type record medium. As a result of this, the card type record medium can be inserted and ejected safely.

Also, in accordance with a moving method of a front panel of an electronic apparatus according to the fourth aspect of the invention, the panel moving mechanism moves the support member backward and at the time of a closing operation of raising up the front of the front panel, it is detected whether or not the card type record medium has been inserted into the record medium storage portion and also it is detected whether or not the card type record medium has been electrically connected to the body part, and it is determined that the card type record medium has not been inserted properly when it is determined that the card type record medium has been inserted and has not been electrically connected, and the panel moving mechanism is stopped and the closing operation of the front panel is stopped. As a result of this, the card type record medium which has not been inserted properly can be prevented from interfering with the front panel.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An electronic apparatus comprising:

a body part having a record medium storage portion for storing at least a card record medium insertable and ejectable from an insertion hole provided at a front surface thereof;

a front panel provided at the front surface of the body part;

a support member attached to a lower end of the front panel and supports the front panel rotatably by using the lower end of the front panel as the center of rotation;

a panel moving mechanism for moving the support member in forward and backward directions, thereby moving the front panel to an opened state in which the front panel is tilted so that a front surface of the front panel turns upward and the front surface of the body part to be exposed, and to a closed state in which the front panel is raised upright and covers the front surface of the body part;

a power control section for controlling a power supplied to the card record medium in conjunction with movement of the front panel; and a signal generating section for generating a signal in conjunction with opening and closing operations of the front panel, wherein the power control section detects a tilt state of the front panel based on the signal and controls the power supplied to the card record medium.

2. The electronic apparatus as claimed in claim 1, wherein the power control section stops supplying the power to the card record medium by the time when either the insertion hole or an operation part for ejecting the card record medium from the record medium storage portion provided at the front surface of the body part is exposed at the time of an opening operation of the front panel.

3. An electronic apparatus comprising:

a body part having a record medium storage portion for storing at least a card record medium insertable and ejectable from an insertion hole provided at a front surface thereof;

a front panel provided at the front surface of the body part;

a support member attached to a lower end of the front panel and supports the front panel rotatably by using the lower end of the front panel as the center of rotation;

a panel moving mechanism for moving the support member in forward and backward directions, thereby moving the front panel to an opened state in which the front panel is tilted so that a front surface of the front panel turns upward and the front surface of the body part to be exposed, and to a closed state in which the front panel is raised upright and covers the front surface of the body part;

a first detection section for detecting whether or not the card record medium is inserted into the record medium storage portion;

a second detection section for detecting whether or not the card record medium is electrically connected to the electric apparatus;

a determination section for determining an insertion state of the card record medium based on a state detected by the first detection section and a connection state detected by the second detection section; and a movement control section for controlling the panel moving mechanism based on the insertion state determined by the determination section.

4. The electronic apparatus as claimed in claim 3, wherein the determination section determines that the card record medium is not inserted properly when the first detection section detects that the card record medium is inserted into the record medium storage portion and the second detection section detects that the card record medium is not electrically connected, and the movement control section controls the panel moving mechanism to stop when the determination section determines that the card record medium is not inserted properly.

5. The electronic apparatus as claimed in claim 3, further comprising:

a display section for displaying information relevant to the insertion state or the connection state determined by the determination section.

6. The electronic apparatus as claimed in claim 3, further comprising:

a notification section for providing a notification that the cart record medium is not inserted properly when the determination section determines that the insertion state is improper.

7. A power control method for an electronic apparatus having a body part having a record medium storage portion for storing at least a card record medium insertable and ejectable from an insertion hole provided at a front surface thereof, a front panel provided at the front surface of the body part, a support member attached to a lower end of the front panel and supports the front panel rotatably by using the lower end of the front panel as the center of rotation, and a panel moving mechanism for moving the support member in forward and backward directions, thereby moving the front panel to an opened state in which the front panel is tilted so that a front surface of the front panel turns upward and the front surface of the body part to be exposed, and to a closed state in which the front panel is raised upright and covers the front surface of the body part, a method comprising:

detecting a tilt state of the front panel based on a signal issued in conjunction with opening and closing operations of the front panel; and stopping a power supplied to the card record medium when determined that either the insertion hole or an operation part for ejecting the card record medium from the record medium storage portion provided at the front surface of the body part is exposed based on the detecting of the tilt state of the front panel.

8. A method for moving a front panel of an electronic apparatus having a record medium storage portion for storing at least a card record medium insertable and ejectable from an insertion hole provided at a front surface thereof, a front panel provided at the front surface of the body part, a support member attached to a lower end of the front panel and supports the front panel rotatably by using the lower end of the front panel as the center of rotation, and a panel moving mechanism for moving the support member in forward and backward directions, thereby moving the front panel to an opened state in which the front panel is tilted so that a front surface of the front panel turns upward and the front surface of the body part to be exposed, and to a closed state in which the front panel is raised upright and covers the front surface of the body part, a method comprising:

detecting whether or not the card record medium is inserted into the record medium storage portion and whether or not the card record medium is electrically connected to the electric apparatus, when moving the front panel to the closed state;

determining that the card record medium is not inserted properly when it is detected that the card record medium is inserted into the record medium storage portion and that the card record medium is not electrically connected to the electronic apparatus; and controlling the panel moving mechanism to stop when the card record medium is not inserted properly.

* * * * *